United States Patent
Pablo (10) Patent No.: US 6,679,285 B2
(45) Date of Patent: Jan. 20, 2004

(54) FAUCET FOR FILLING TANKS

(76) Inventor: Fominaya Agulló Pablo, Partida de Saboya, 110 46120, Alboraya (ES)

( * ) Notice: Subject to any disclaimer, the term of this patent is extended or adjusted under 35 U.S.C. 154(b) by 0 days.

(21) Appl. No.: 10/302,818

(22) Filed: Nov. 22, 2002

(65) Prior Publication Data

US 2003/0079780 A1 May 1, 2003

Related U.S. Application Data (63) Continuation of application No. PCT/ES01/00365, filed on Oct. 2, 2001.

(30) Foreign Application Priority Data

Oct. 6, 2000 (ES) .......................................... P200002418

(51) Int. Cl.[7] ........................ F16K 31/34; F16K 31/385
(52) U.S. Cl. ...................... 137/414; 137/426; 137/436; 137/443; 73/322.5
(58) Field of Search ................... 137/413, 414, 137/426, 435, 436, 443, 444; 73/322.5

(56) References Cited

U.S. PATENT DOCUMENTS

| | | | | |
|---|---|---|---|---|
| 1,520,914 A | * | 12/1924 | Spearing | 137/435 |
| 1,525,334 A | * | 2/1925 | Stengel | 137/436 |
| 1,787,601 A | * | 1/1931 | Swanberg | 137/436 |
| 1,901,633 A | * | 3/1933 | Clemons | 137/436 |
| 2,781,772 A | * | 2/1957 | Russell | 137/414 |
| 3,011,515 A | * | 12/1961 | Kravanga | 137/435 |
| 3,171,424 A | * | 3/1965 | Shames et al. | 137/435 |
| 3,207,170 A | * | 9/1965 | Filton | 137/436 |
| 3,414,005 A | * | 12/1968 | Fulton et al. | 137/436 |
| 3,429,333 A | * | 2/1969 | Schoepe et al. | 137/414 |
| 3,669,138 A | * | 6/1972 | Schoepe et al. | 137/414 |
| 3,693,649 A | * | 9/1972 | Gordon et al. | 137/414 |
| 4,072,164 A | * | 2/1978 | Kaden | 137/414 |
| 4,182,364 A | * | 1/1980 | Gilbert et al. | 137/426 |
| 4,338,964 A | * | 7/1982 | Schoepe | 137/443 |
| 4,600,031 A | * | 7/1986 | Nestich | 137/426 |
| 4,628,956 A | * | 12/1986 | Roberts et al. | 137/436 |
| 5,255,703 A | * | 10/1993 | Johnson | 137/414 |
| 5,280,803 A | * | 1/1994 | Swift et al. | 137/443 |
| 5,439,025 A | * | 8/1995 | Johnson | 137/426 |
| 5,623,961 A | * | 4/1997 | Nichols-Roy | 137/444 |
| 5,715,859 A | * | 2/1998 | Nichols-Roy | 137/414 |
| 5,738,141 A | * | 4/1998 | Blanke et al. | 137/414 |
| 5,964,247 A | * | 10/1999 | Johnson | 137/414 |
| 6,332,475 B1 | * | 12/2001 | Brougham | 137/414 |

FOREIGN PATENT DOCUMENTS

EP 0369404 * 5/1990 ................ 137/414

* cited by examiner

Primary Examiner—George L. Walton
(74) Attorney, Agent, or Firm—Klauber & Jackson

(57) ABSTRACT

The invention relates to a faucet for filling tanks known as silent and/or fast-closing faucets. The faucet comprises a basic structure and functionalities such as those disclosed in Patent 9400095. The device assembly controlling opening and closing of the faucet has important improvements in comparison with other conventional faucets and in comparison with the above-mentioned patent. The faucet also includes a lever system connecting the float and the piston acting upon the opening and closing device. In additional, improvement deals with the telescopic structure of the fluid outlet tubes to the tank in order to regulate the height thereof depending on the depth of the tank so that the fluid is always discharged into the water with the aim of preventing noises.

34 Claims, 7 Drawing Sheets

FAUCET FOR FILLING TANKS

This application is a continuation of international application number PCT/ES01/00365,filed on Oct. 2, 2001 (status, abandoned, pending, etc).

The invention refers to a faucet for filling tanks which is of the type known as silent and/or fast closing.

It essentially concerns a faucet that in general possesses a structural and functional base like the faucet for patent P-9400045, but with the incorporation of various improvements and new devices that imply a more efficient functioning in all senses, principally with regard to the advantage of functioning correctly under any pressure of the water network feeding that faucet, and with regard to the reduction of noise.

As it occurs with the faucet of patent P-9400045, the faucet of the invention can function as a normal faucet, in other words sealing by means of the thrust of the rubber piece when the float or float rises up in the absence of pressure in the water supply.

BACKGROUND OF THE INVENTION

Different types of fast closing or silent faucet are known for filling toilet tanks, and they all have a close functional relationship.

In principle, the water discharges into the tank and the sealing is achieved by the effect of the pressure exerted by the water network itself on the rubber seal. For this, the closing is instantaneous and fast, thereby eliminating progressive closing which causes noise.

So far, it can be asserted that this type of faucet presents important technical problems, especially due to the fact that it only works at very specific pressures, in such a way that when the values are high these conventional faucets very easily become blocked and unusable.

Others, which work with micrometric measurements for the passage of water, also very easily become blocked and of course cease to work.

On the other hand, present-day fast closing faucets for filling tanks do not function with water at high pressure.

A faucet is known that seems to function acceptably and overcomes the problems mentioned in the preceding paragraphs, though it is very large and costly to produce, and its functioning becomes irregular at high pressures.

Among the registers that are known and which have some of the drawbacks mentioned above can be mentioned patent P-9001516, utility model 244.814, utility model 246.739, etc.

As an antecedent of the feed faucet for tanks that uses a vertical tube for ducting the water to the bottom of the tank and eliminating noise mention can be made of: utility model 271.378, though it employs a mechanical sealing system by thrust of the arm associated with the float.

Patent P-9400045 refers to a faucet for filling tanks which possess a fast and silent closing during the filling of a toilet tank, at the same time as functioning with high and low pressures. This is a dual functioning faucet: on the one hand it acts as a fast closing and silent faucet, taking advantage of the actual pressure of the water in the network for carrying out the sealing, and on the other, in the absence of pressure, it functions as an ordinary faucet, in other words by means of the thrust that the rising of the water level exerts on the arm of the float or float.

DESCRIPTION OF THE INVENTION

The faucet for filling tanks which constitutes the object of the invention is characterised in that it functions efficiently at any pressure covering a wide range of values.

In principle, it includes a structural base like the faucet of patent P-9400045.

So, the new faucet consists of a casing with a water inlet duct and an outlet duct through which the liquid flows to the outside in order to be able to fill the tank. Coupled to this casing by means of the collaboration of a threaded locking ring is a tubular piece so that this and the casing together shape an internal cavity in which is housed a set of elements for controlling the sealing and release of the faucet.

Within the internal cavity there are two facing elastic rubber pieces, forward and rear, each being interposed between the casing and the tubular piece, and between the two rubber pieces there exists an intermediate chamber that links with the other rear chamber via an opening in the second rubber piece, this rear chamber presenting a constriction corresponding to the tubular piece, where an intermediate body is fitted provided with a longitudinal opening, at the same time as being in contact with a piston on which acts the rocker arm linked to the corresponding float or float.

The facing rubber pieces present a different structure from that presented by the rubber pieces of patent P-9400045, at the same time as being linked and associated in a way that is also different.

The opening of the rear rubber piece is over-dimensioned with the aim of helping to release the pressure in the chamber confined between the two rubber pieces during flushing.

The intermediate body presents a very different structure from that presenting by the moving body of patent P-9400045. Moreover, the new faucet incorporates a compensating spring located between the intermediate body and the rear rubber piece. This spring helps the recovery of the expansion undergone by the rear rubber piece during the sealing.

The intermediate chamber confined between the two facing rubber pieces is connected to the inlet duct of the water network via a narrow opening made in the forward rubber piece and in which comfortably fits a rod integral with a central piece provided with certain holes for allowing the passage of the fluid. Concentric with this inlet duct is another larger one that connects the first duct with the tank via the outlet pipe or duct, preferably vertical. Moreover, these two concentric ducts are related one with the other by means of the forward rubber piece which, depending on its position, will permit the passage of water from the inlet duct to the larger concentric duct and from here to the outlet pipe.

These two concentric ducts are separated by an annular partition, the free edge of which can be used for seating the forward rubber piece when the sealing takes place in order to prevent the passage of fluid. That free edge of the annular partition presents a curved-convex shape permitting a more effective seal when the forward rubber piece is seated on it.

When the tank is empty, the flow of liquid will pass through the inlet duct until it reaches the larger duct, passing from this to the tank by means of the outlet pipe. During this stage of filling, and thanks to the pressure of the water in the network, a tapping takes place of the fluid via the narrow opening made in the forward rubber piece, and the fluid floods the intermediate chamber and straight away crosses the opening of the rear rubber piece in order to flood the rear chamber as well. This rear chamber does not include a drainage duct as in the case of patent P-9400045. Instead, drainage has been provided via the thread where the locking ring of the tubular piece couples. In this way, excess pressure is released from the faucet during the filling of the tank.

When the tank reaches the proper level, the circulation of the fluid is automatically cut off by means of the float linked to the lever that will act on the piston, which then becomes axially displaced towards the interior, as it moves pulling along the intermediate body with the longitudinal opening which is sealed by that piston, that body covering the opening of the rear rubber piece. In that way, the circulation of the fluid is detained in the intermediate chamber where the pressure of the water will push the two rubber pieces in opposite directions in such a way that the forward rubber piece will prevent the passage of fluid from the inlet duct to the outlet duct.

When the tank is emptied, the piston returns to its initial position and with it all the other elements, thereby releasing the closing pressure generated in the intermediate chamber, with which the circulation of the water will commence again until the tank is filled once more.

This, piston incorporates at its internal end a rubber seal which is what closes the narrow longitudinal opening of the intermediate body.

The fine rod crossing the opening of the forward rubber piece regulates the passage of the fluid into the intermediate chamber. Similarly, the displacement of the forward rubber piece on the rod favours the continual cleaning of the small concentric passage that exists.

In addition to sealing the opening of the rear rubber piece when appropriate, the intermediate body which incorporates the longitudinal opening also receives the recoil thrust following the sealing. For this reason, provision has been made so that it is forced to stop on an intermediate step of the tubular piece housing the piston, in such a way that it retains the recoil pressure of the rear rubber piece and this is not excessively transmitted to the float via the piston; these latter two elements support solely the sealing pressure of the longitudinal opening of the intermediate piece.

The faucet of the invention also functions perfectly when the flow of water supplied by the network is minimal, in other words, when it is "drop by drop".

The vertical outlet pipe is telescopic for being adapted to the depth of the tank in order to ensure that the outlet of the water is made below the minimum level of water left in the tank after flushing in order to thereby reduce the noise of the filling.

The float is able to include a small tank that will be filled with fluid, the weight of which will improve the descent of the float once the faucet has been actuated for flushing the tank.

In the outlet duct for the fluid there is a tapping where a small float has been provided by way of a non-return valve which also makes the faucet more silent so that during the filling of the tank this tapping is kept sealed, thus preventing the emission of sounds.

When that float ceases to float due to the absence of water once the faucet is sealed, it unblocks the opening located above it, releasing it for the purpose of permitting the entrance of air and thus avoiding the non-return effect.

In order to facilitate a better understanding of this descriptive report, some figures are included below in order to represent the object of the invention.

DESCRIPTION OF A PREFERRED EMBODIMENT OF THE INVENTION

Described below is an example of an embodiment of the invention following the numbering adopted in the figures.

The faucet consists of a casing 1 that includes in principle an inlet pipe or duct 2 and an outlet duct or pipe 3.

Coupled to the casing 1, with the aid of an external threaded locking or fastening ring 4, is a tubular piece 5 in such a way that between it and the casing 1 there is an internal cavity defined in which are housed a series of elements controlling the sealing and passage of the fluid.

Inside the internal cavity there exists a wider zone housing two facing rubber pieces made of an elastic material: one forward 6 and the other rear 7, with these two being interposed between the casing 1 and the tubular piece 5. The two elastic rubber pieces 6 and 7 are actuated by means of a union ring 8 of double conicity, which forms the core or frame of the perimeters of the rubber pieces, particularly during the action of tightening the unit. In this way we can exert greater pressure on the perimeters of those rubber pieces without deforming them, and thereby ensure the absence of leaks, even with very high water pressures.

Between these two elastic rubber pieces 6 and 7 there exists an intermediate chamber 9 which is connected in one direction with a rear chamber 10 via an over-dimensioned opening 11 of the rear rubber piece 7. The purpose of this opening is to produce a faster release of the pressure existing in the intermediate expansion chamber 9 at the moment of proceeding to flush the tank, with which the immediate unsealing of the faucet will take place.

Other conventional faucets have always used rubber pieces with capillary openings which were difficult to unseal properly, which meant that the release of pressure was poorer than in the method we have stated above.

The rear chamber 10 of the tubular piece 5 includes a constriction 12 where an intermediate body 13 is fitted provided with a longitudinal drainage hole 14. The sealing surface of the end of that longitudinal drainage hole 14 must be minimal, and in this case the seating has been rounded so that the elastic stub 15 makes a closure with the minimum contact surface. At the same time it makes contact with an elastic stub 15 inserted frontwise onto a piston 16 on which will act a lever 17 associated with a vertical shaft 18 which threads into part of a float 19, in order to therefore be able to regulate the height of the float so as to vary the volume of water in the tank.

Figure 4:
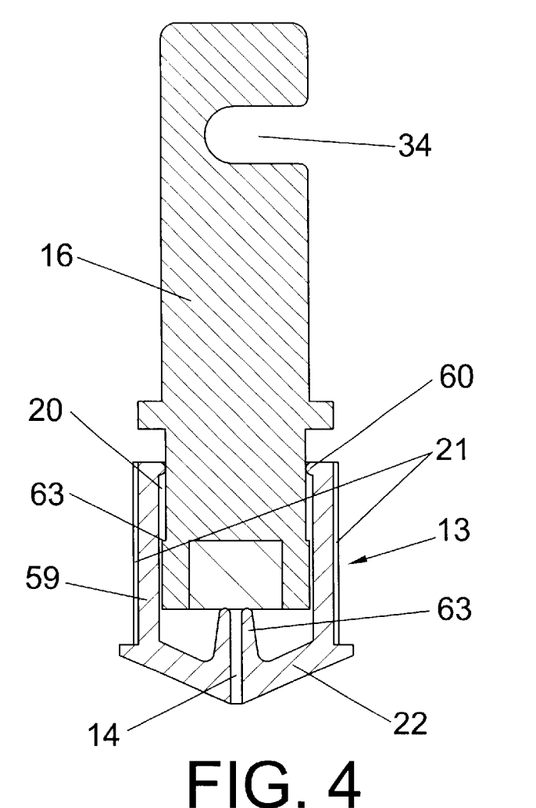
FIG. 4 shows a view of an intermediate body and a piston forming part of the assembly of the faucet of the invention.

The intermediate body 13 consists of an upper section 20 of tubular structure in which certain longitudinal ribs 21 are made, and a lower section 22 of conical shape facing the opening of the hole 11 of the rear rubber piece 7. The tubular section 20 of the intermediate body 13 is guided against the lower part of the constriction 12 of the tubular piece 5, at the same time as the lower part of the piston 16 is in turn housed within the tubular section 20 of the intermediate body 13 causing the closure of its conical section 22 on the over-dimensioned opening of the rubber piece 7, and of the elastic stub 15 of the piston 16 on the longitudinal opening 14.

The constriction 12 of the tubular piece 5 possess an upper step 23 where an annular ledge 24 integral with the piston 16 acts as a stop in order to limit the axial travel of the piston 16 towards the outside. This annular ledge 24, in collaboration with the upper step 23, ensures a correct closure in order to prevent the escape of fluid in the vertical direction during the unsealing. There is normally a small escape that is expelled which does not have any great importance.

The upper chamber 10 contains a compensating spring 25 which acts as a stop against the rear rubber piece 7 and against the tubular piece 5. This spring 25 favours the return of the rear rubber piece 7 to its original position during unsealing, quickly compensating for the expansion undergone by the rear rubber piece 7 during the sealing.

When the water reaches as far as the rear chamber 10, it also floods the interstices existing between the longitudinal ribs 21 of the intermediate body 13 and the tubular piece 5. That rear chamber 10 possesses an outlet drainage via the thread 26 existing between the threaded locking or fastening ring 4 and the casing 1, and for this the said thread has at least one smooth longitudinal narrow zone interrupting that thread. In this way, the fluid inside the rear chamber 10 is discharged to the outside via that smooth zone. The tubular piece 5 includes some radial openings 27 for facilitating the passage of the water from the rear chamber 10 as far as the smooth zone for drainage made in the thread 26.

The lever 17 links two lateral stubs 28 integral with the tubular piece 5, at the same time as the end of the lever 17 includes a short transverse shaft 29 that fits into a recess 30 of a swinging piece 31 which, by means of another short shaft 32, links to a complementary slot 33 of the tubular piece 5. Finally, this swinging piece 31 fits into a central recess or undercut 34 of the piston 16 via a short central shaft 35 with the aim of vertically displacing the piston 16. This set of pieces that act on the piston 16 multiply the thrusting force of the float 19, an increased thrust that becomes necessary when working with high pressures.

The recess 34 collaborates in keeping the pieces 16 and 13 fitted even when the faucet is dismantled. The retaining means for those pieces 16 and 13 are materialised by means of the undercuts 60 of the tubular section 20, and the stops or undercuts 61 provided in the piston 16 prevent the accidental separation of these pieces following the opening or removal of the faucet due to dissociation of the pieces 1 and 5, and they also remain joined to the lever 31 thanks to the recess 34. We thus manage to maintain all these pieces connected to the body 5 and the threaded ring 4, preventing their desegregation.

It can be pointed out that when the flushing of the tank takes place, the float 19 descends and raises up the piston 16 providing a clear route for the pressure that is generating the sealing and so the filling of the tank commences again.

The compensating spring 25 acts as a stop against the tubular piece 5 at the same time as fitting into an annular channel 36 of that tubular piece 5.

The closure of the over-dimensioned opening 11 of the rear rubber piece 7 is done by means of the conical surface of the lower section 22 of the intermediate body 13. This conical body permits proper sealing no matter what the incoming pressure might be, since its conical surface allows the sealing zone to be progressive as the pressure increases.

The intermediate chamber 9 confined between the two elastic rubber pieces 6 and 7, connects with the rear chamber 10 by means of the opening 11 and also connects in the other direction with the inlet duct or pipe 2 of the water network via a narrow opening 37 where a rod 38 comfortably fits integral with a central piece 39 provided with some gaps for permitting the passage of the fluid. Concentric with this inlet duct 2 there exists another larger duct 40 which is connected to the tank via two telescopic pipes 41 and 42 in such a way that the larger diameter one 41 is connected to the outlet duct 3. Both pipes are preferably associated with each other with the aid of a friction rubber piece 43 in order to prevent undesired noises and vibrations.

This telescopic pipe 42 is adapted to the depth of the tank in order to ensure that the outlet for the water is made below the minimum water level in order to thereby reduce as much as possible the noise of the filling.

The two concentric ducts 2 and 40 are connected by means of the forward rubber piece 6 in such a way that, depending on its position, it will permit the passage of water from the inlet duct 2 to the larger concentric duct 40 and from there to the outlet duct 3 connected to the two telescopic pipes 41 and 42.

The two concentric pipes 2 and 40 are separated by an annular partition 44, the free edge 45 of which is suitable for pressing on the forward rubber piece 6 when the closure of the faucet takes place, with which the entrance of water into the tank will be cut off. That free edge of the annular partition 44 is given a rounded finish so that the sealing in this zone can be more efficient.

In addition, it can be stated that the rounded edge 45 of the annular partition 44 lies below the seating plane of the forward rubber piece 6 in order to ensure the passage of water at any pressure no matter how low it might be.

When the tank is empty, the flow of liquid will pass through the inlet duct 2 as far as reaching the larger duct 40, passing from this to the tank by means of the outlet pipe 3. During this stage of filling and thanks to the pressure of the water in the network, a tapping takes place of the fluid via the narrowing opening 37 made in the forward rubber piece 6, and this fluid floods the intermediate chamber 9 and straight away crosses the over-dimensioned opening 11 of the rear rubber piece 7, also flooding the rear chamber 10, which includes drainage as mentioned earlier which, in collaboration with the longitudinal opening 14 of the intermediate body 13, advantageously prevents any pressure increase in the chamber 9 during the filling process, which would lead to anomalous functioning.

When the tank reaches the proper level, the circulation of the fluid is automatically cut off by the float linked to the lever 17, which will act on the piston 16, displacing the latter axially towards the interior, as it moves pulling along the intermediate body 13 provided with the longitudinal opening 14, said intermediate body 13 covering in its conical section 22 the over-dimensioned opening of the rear rubber piece 7. In this way, the circulation of the fluid is detained in the intermediate chamber 9 where the pressure of the water will push the two rubber pieces 6 and 7 in opposite directions in such a way that the forward rubber piece 6 will prevent the passage of fluid from the inlet duct 2 to the outlet duct 40 while the rear rubber piece 7 produces a thrust on the intermediate body 13, which is sealed by the rubber piece 15 of the piston 16. Until the complete sealing of the faucet assembly is carried out, the piston 16 receives the thrust of the piece 13 which is in turn pushed by the rear rubber piece 7 which has been displaced against the action of the lever 17. Therefore, even the float experiences this thrust which translates into a slight sinking. With this sinking we apply an additional thrust which increases the thrust of the piston 16 on the intermediate piece 13, ensuring the closure of the longitudinal opening with any type of pressure. In this manner, a closed set of forces is established, where the float thrusts in the opposite direction to the thrust produced by the rear rubber piece 7. Nevertheless, the piston 16 finally only supports the pressure of the internal fluid of the intermediate chamber 9 transmitted via the duct 14 and the intermediate body 13.

When the tank is emptied, the piston 16 returns to its initial position. In this way, the longitudinal opening 14 of the intermediate body 13 is opened and allows the pressure accumulated in the intermediate chamber 9 to escape, with which all the elements return to their original position and the circulation of the water is re-established again until the tank is filled once more.

The fine rod 38 crossing the opening 37 of the forward rubber piece 6 regulates the passage of the fluid into the intermediate chamber 9, in such a way that it is not necessary to make an opening of very small dimensions, which would easily become blocked, and which is in any case technically very difficult to carry out owing to the material characteristics of the rubber. Similarly, the small displacement of the forward rubber piece 6 on the rod 37 favours the continual cleaning of the small concentric passage that exists.

In addition to sealing the over-dimensioned opening 11 of the rear rubber piece 7 when appropriate, the intermediate body 13 which incorporates the longitudinal opening 14 also receives the recoil thrust of the rubber piece 7 following the sealing. The spring 25 ensures the original position of the rubber piece 7 and maintains the travel of the pieces 13, 16 and 19, necessary for carrying out the closure correctly.

The central piece 39 supporting the rod 38 and which is located in the inlet duct 2 can be independent, in other words, inserted in its location, or it can form an integral part of the actual casing 1.

Moreover, we will describe the second functioning option of this new faucet that is produced when the supply network fails to provide enough pressure, or when there is minimal flow, in other words, "drop by drop" flow of fluid. It is then that the faucet demonstrates its versatility, mechanically (without the intervention of fluid pressures) carrying out the sealing. The float or float thrusts the piston 16 towards the interior as the level of the water rises in the tank, this thrust being transmitted to the intermediate body 13 which eventually makes contact with the rear rubber piece 7 and this in turn bends towards the interior and produces central contact with the forward rubber piece 6 which is pushed against the closure zone of the inlet duct 2, producing the cutting off of the passage of fluid towards the outlet duct 3.

In terms of the forward rubber piece 6, it receives the entrance of fluid under pressure through the opening 37, as we have said earlier; nevertheless, this capture of fluid needs to be made before the flow loses pressure when it passes to the outlet duct 3. To achieve this, the said rubber piece 6 is provided with a central ledge 46 introduced inside the inlet duct 2 very close to the central piece 39. In this way, the intake of fluid is done at full pressure, which favours the correct functioning of the faucet. That central ledge 46 possesses an exterior corner 47, rounded in shape in order to facilitate the circulation of fluid in that zone, thus preventing undesired whistles, noises and vibrations during the closing.

Delving further in the silent characteristics of the new faucet, it can be pointed out that this quality is appreciably favoured to the degree that there does not exist any reduction in the passage of water in the outlet 3 and it is even possible for this outlet duct 3 to present a greater rate of flow; in both cases, the whistling of the flow of liquid becomes noticeably less since there is no narrowing, which favours the silent operation of the faucet.

The outlet duct 3 contains a tapping 48 where a small float 49 has been inserted by way of a non-return valve in order to make the faucet more silent if possible, in such a manner that during the filling of the tank, this tapping 48 is kept sealed, thus preventing the outlet of possible hums or noises, while, once the tank is full, the tapping is kept open in order to ensure the non-return effect.

The float 19 can incorporate a small partition or rail 50 in its upper base which gives rise to a small tank of low height which can be filled with water, thus generating an additional weight which is very useful for improving the descent once the flushing mechanism has been pressed.

Optionally, the float 19 could be enclosed via its lower base by means of a cover 51, which would prevent noises caused by the bubbling of water generated if it were open, and which is produced when the air inside the float exits as the float sinks. This cover 51 can also perform the role of an additional tank for water in a manner similar to that provided for in the preceding paragraph. In this case, the float 19 will include two small holes 52 and 53 at the desired height for permitting the entrance of water and the exit of air, respectively. As the tank fills up, the water becomes introduced through the holes 52 and 53 within the actual float 19 up to a certain level, finally forming an upper air chamber within that float 19. When flushing takes place, the water found inside the float 19 generates an additional weight that is very useful for improving the descent once the flushing has been performed. This additional weight will start to have an effect when the water level of the tank descends to below the small holes 52 and 53 of the float 19.

Figure 5:
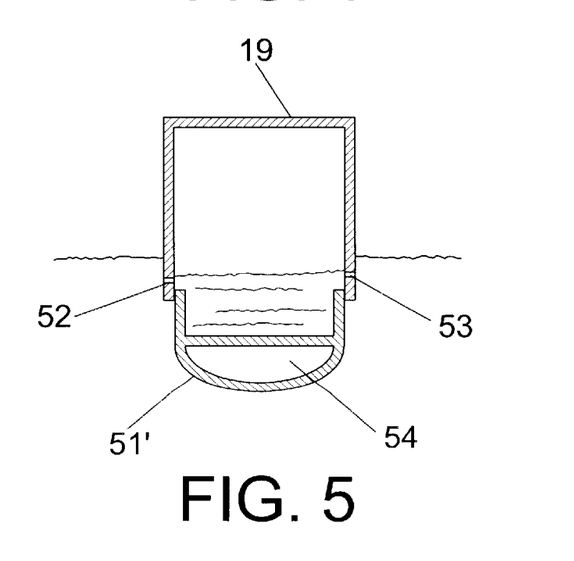
FIG. 5 shows a view of a float of the faucet including a lower cover provided with an air chamber.

Moreover, FIG. 5 shows a cover 51' which possesses at least one auxiliary air cavity 54 for improving the additional thrust of the float 19 during its flotation, particularly when the sealing of the faucet takes place. In that moment, the interior air tank does not act since the pressures have become equalised.

As has been stated above, the interior water tank of the float 19 will not start to act until the level of liquid in the tank descends to below the holes 52 and 53 of the float 19.

The larger duct 40, concentrically provided with an inlet duct 2, possesses a narrow tubular extension for drainage 55.

On its exterior face the forward rubber piece 6 possesses an annular channel of curved section 56 for improving its flexing.

The piston 16 possesses a longitudinal rib 57 which fits into and is guided in a complementary groove 58 made in the tubular piece 5. In this manner, the positioning of the piston 16 is ensured, at the same time as preventing any unwanted rotation of it.

The tubular section 20 of the intermediate body 13 consists of various radial fins 59, the upper ends of which are finished in some small internal flanges 60 complemented with a slight annular step 61 of the piston 16. In addition, this tubular section 20 includes some wide longitudinal recesses 62 permitting the passage of the fluid.

On the other hand, the lower conical-shaped section 22 includes a central extension 63 that is projected upwards the inside of the tubular section 20, in such a way that said extension 63 of the drainage hole 14 acts as a seal against the elastic stub 15 of the piston 16.

Figures 1, 1A, 1B, 1C:
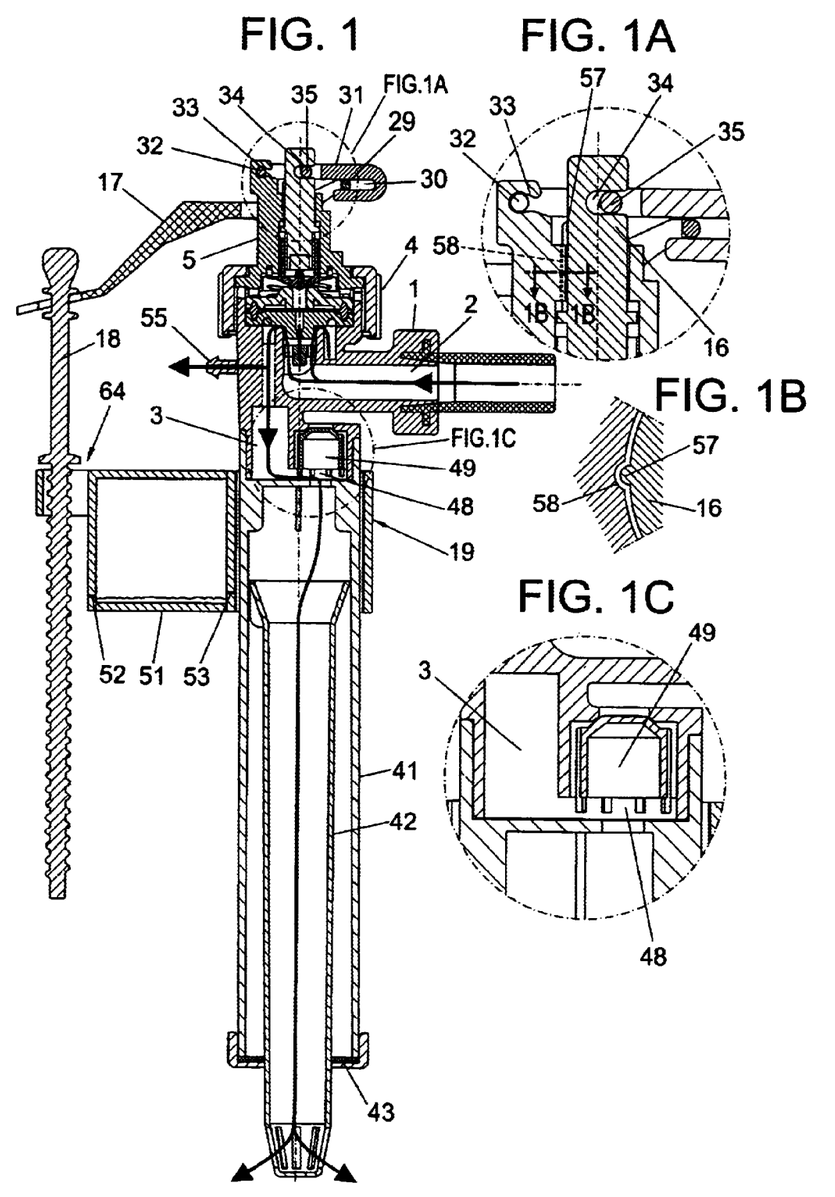
FIG. 1 shows a sectioned elevation view of the assembly of the faucet for filling tanks, forming the object of the invention. It includes a side inlet for water.
Figure 2:
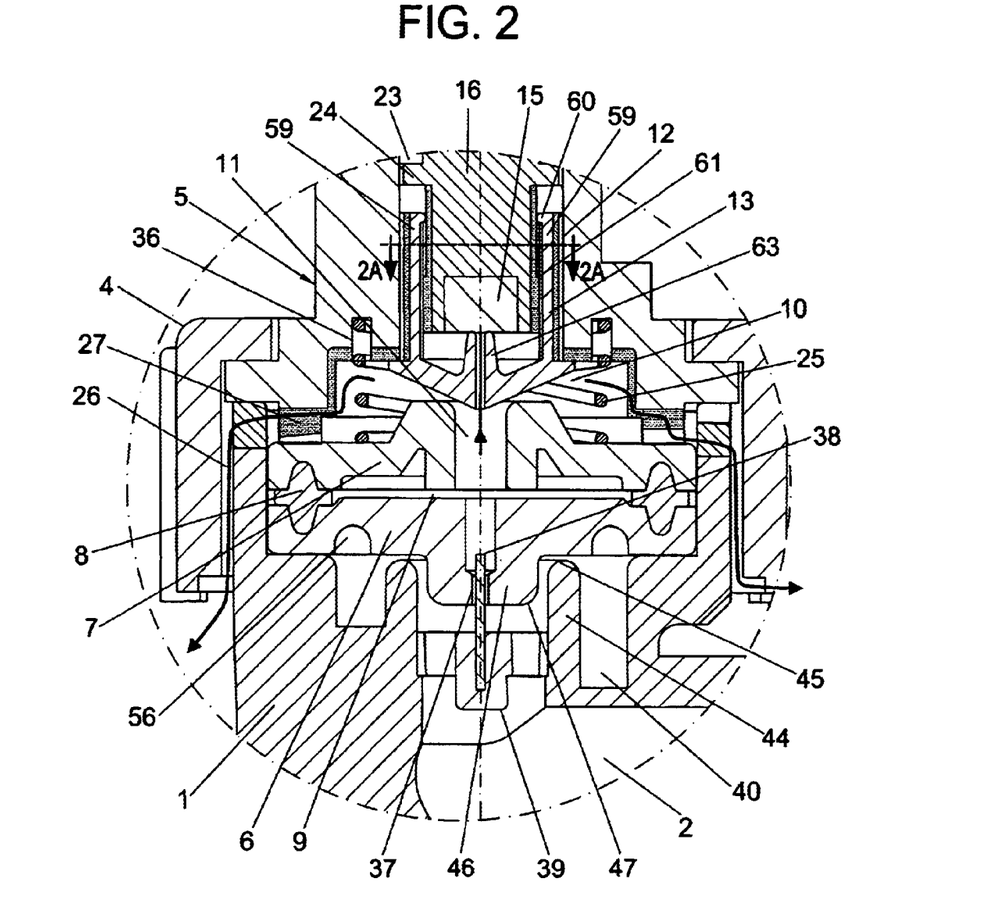
FIG. 2 shows an enlarged view of part of the faucet of the invention.
Figure 2A:
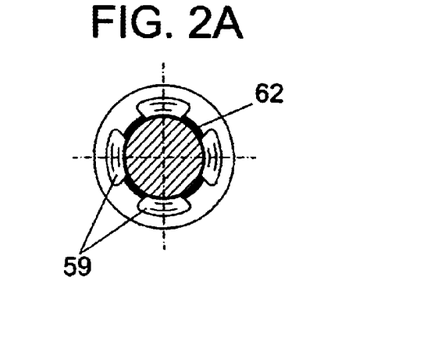
Figure 3:
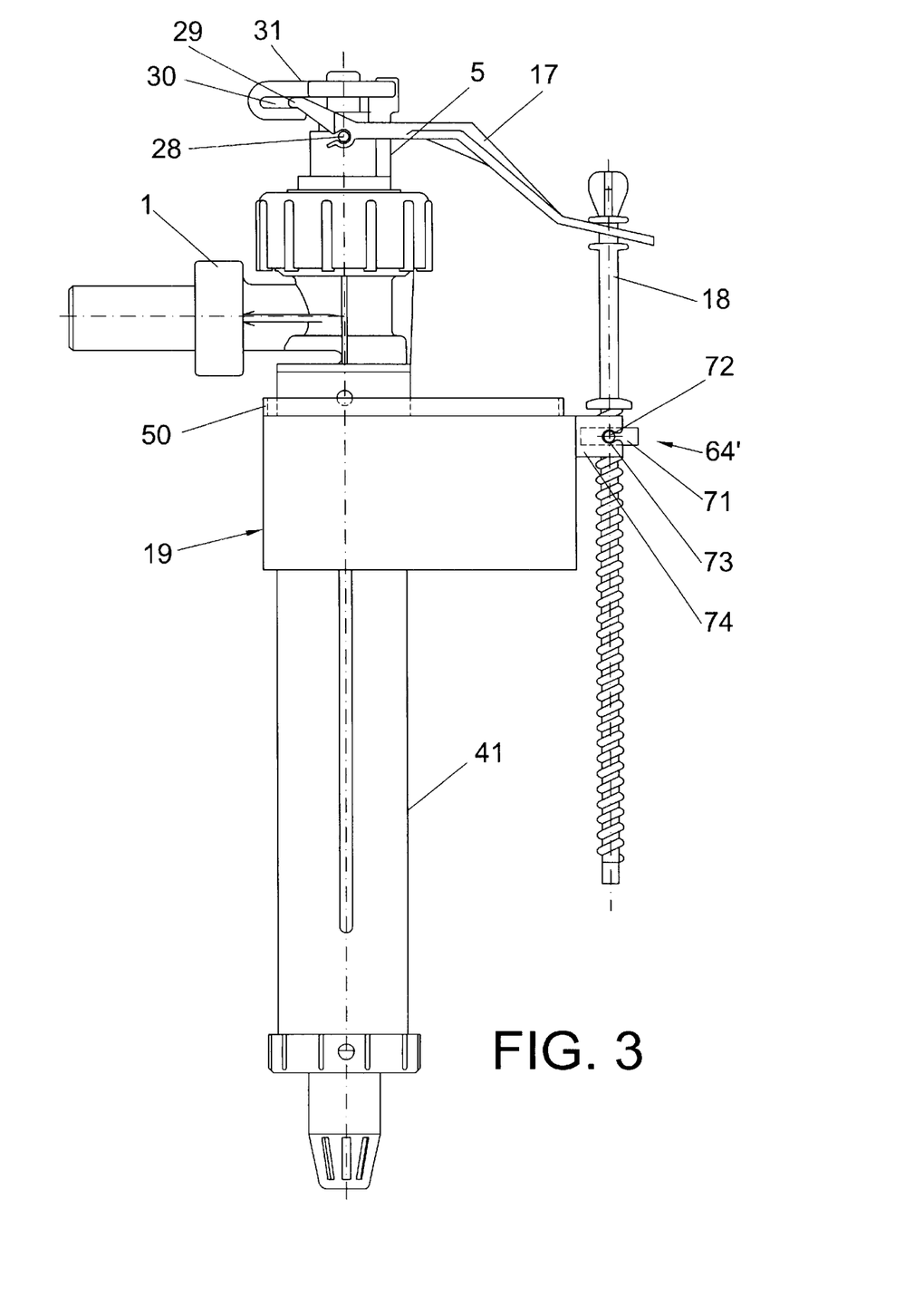
FIG. 3 shows an elevation view of the faucet.
Figure 6:
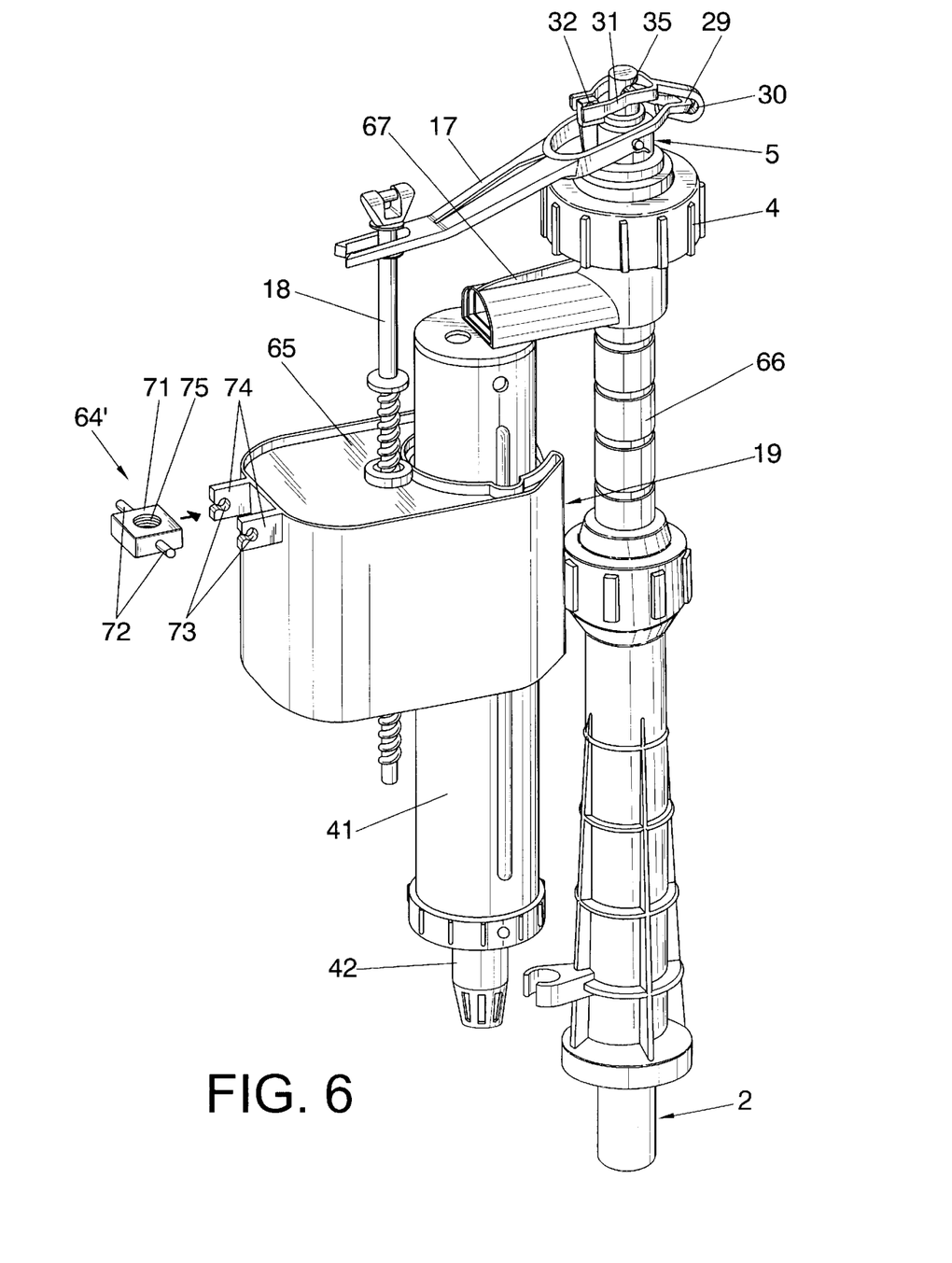
FIG. 6 shows a perspective view of a faucet including a lower entrance for water provided in a vertical direction.

As it occurs with patent P-9400045, the faucet of the invention is applicable to different formats of water inlet, both a side inlet 2 as has been represented in FIGS. 1 and 3, and a lower inlet 2' telescopic in the vertical direction, as has been essentially represented in FIG. 6, or even a fixed vertical inlet.

The float 19 possesses two linking mechanisms for the coupling of the threaded vertical shaft 18: one preferably exterior 64, 64', and the other interior 65 applicable when the water inlet is lower 2' and the outlet pipe 41 is displaced with respect to the vertical of the entrance pipe (FIG. 6). In this way, it is merely necessary to manufacture a single float 19 which will be able to be adapted both to the faucet with side water inlet 2 and to the faucet with lower inlet 2' in the vertical direction, whether fixed or telescopic.

In the case of the lower water inlet 2', the telescopic coupling 41 and 42 for the water outlet will be arranged in a vertical direction close to and parallel with the other vertical direction where the lower inlet pipes and ducts 2' are to be found. Therefore, in this second case it is necessary to couple the threaded vertical shaft 18 on the interior recess 65 of the float 19. Moreover, in this second case of the lower inlet 2', this inlet is arranged in the same vertical as the set of elements of the faucet that carry out the sealing of it.

In the second embodiment of the faucet where the water inlet 2' is lower, the outlet duct 41 is integral with the moving telescopic section of the inlet 2'. In this case (FIG. 7), provision has been made for the upper pipe 66 of the telescopic inlet assembly 2' to have a side duct 67 ending in a double cavity 68 and 69 for facilitating the coupling of the anti-noise device 3, 48 and 49. Coupled to the lap formed by the double cavity 68 and 69 will be the telescopic outlet pipes 41 and 42 which constitute the guide for the float 19. The side duct 67 is not closed, which means that we can manufacture the upper pipe 66 in a single block. Located in the upper part of that upper pipe 66 are two distinct elements for providing the closure of the faucet. The side outlet duct 67 will be closed by means of a plug 70 for the guiding of the water towards the outlet pipes 41 and 42.

Figure 7:
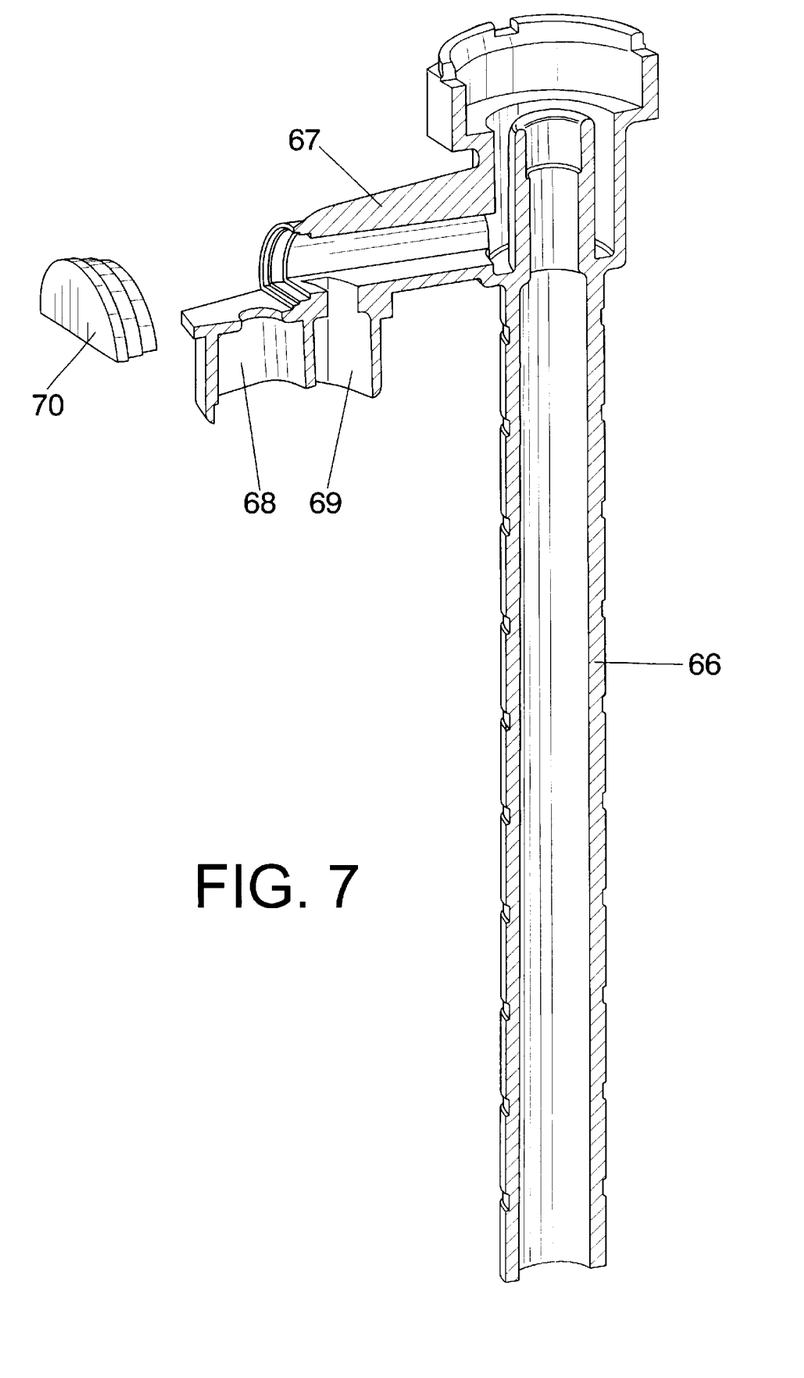
FIG. 7 shows a view of part of the faucet of the preceding figure.

The upper pipe 66 fitted with the outlet 67 will be able to be coupled to any water outlet element, whether this be the pipes 41 and 42 or any other analogous device.

The interior mechanism 65 simply consists of a threaded recess where the thread of the vertical shaft 18 will couple, being able to regulate the height of the float 19.

On the other hand, the exterior mechanism 64' is defined on the basis of a tilting tubular piece 71 which is articulated by means of two facing stubs 72 to two complementary holes 73 made in certain parallel arms 74 integral with the float 19, in such a way that the direction of the facing stubs 72 of the tilting piece 71, and therefore of the articulation, is perpendicular to the threaded vertical shaft 18, which in principle will be coupled to an interior thread 75 of the tilting tubular piece 71.

Moreover, it can be stated that although the association of the vertical shaft 18 to the respective linkage mechanism of the float 19 is done by means of threading, this could also be achieved by any other means.

Figure 8:
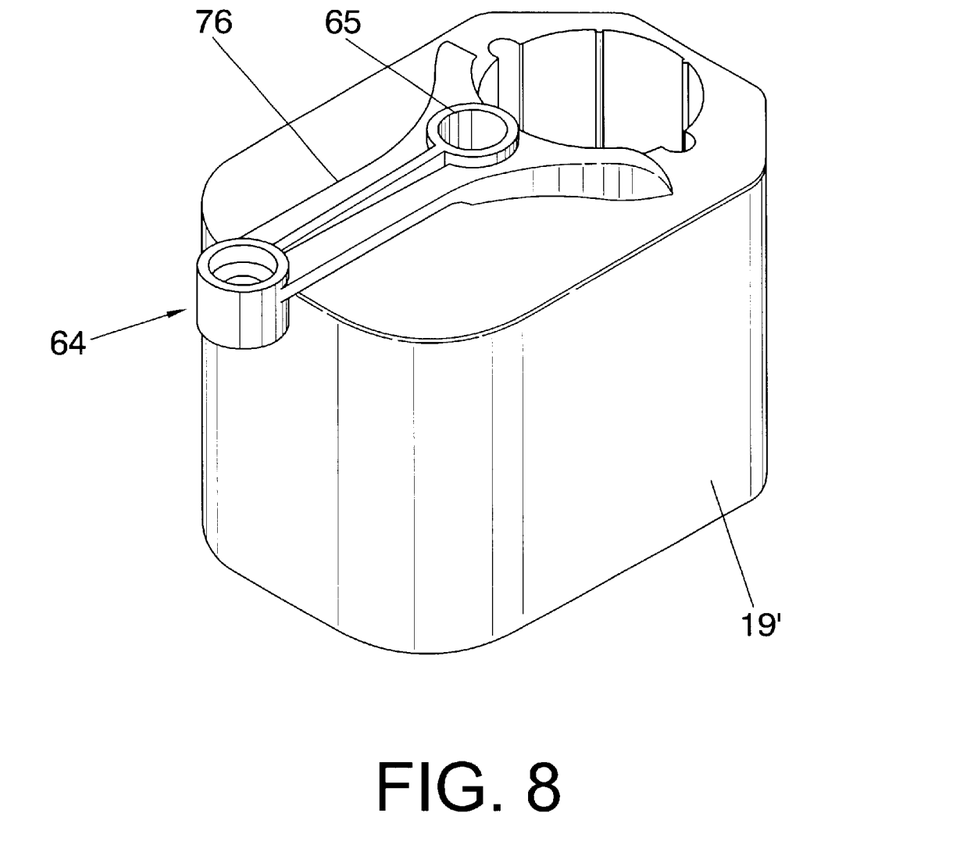
FIG. 8 shows a perspective view of a float different from that shown in the preceding figures.

As an alternative embodiment, provision is also made for a float 19' in which the connection to the vertical shaft 18 is made by means of an arm 76 fitted with two connection means 64, 64', with that vertical shaft 18.

In this way, the force is transmitted on the float in the zone closest to its sliding vertical, with which we avoid any swinging or even blocking of the displacement, all this according to the degree of sliding of the material used, which is a determining factor for establishing the optimum relative movement between the different pieces.

Moreover, provision is also made for the use in either of the variants of the float described 19, 19', of the simple exterior mechanism 64' for improving the connections of the rod or vertical shaft 18 with those floats.

With this simple mechanism 64' we take away rigidity from the connection points, granting them a greater degree of articulation and generating tolerances that are very suitable for the transmission of forces between the different pieces.

In this sense, in FIG. 6 we see an example of application of this detail on the float 19, defining the exterior coupling mechanism 64' in replacement of the exterior coupling mechanism 64 materialised simply by means of a tubular recess.

Finally, it can be stated that, although the association of the vertical shaft 18 to the respective linkage mechanism of the float 19 is done by means of a thread, this could also be achieved by any other means.

What is claimed is:

1. A faucet for filling tanks, of the type comprising a casing that includes an inlet duct and an outlet duct, a tubular piece being secured to that casing by means of an exterior locking or fastening nut, an internal cavity being formed between the casing and the tubular piece in which two facing elastic rubber pieces, a forward elastic rubber piece and a rear elastic rubber piece, are housed and associated by linking means; an intermediate chamber being formed between the two rubber pieces, said chamber being connected in a first direction to a rear chamber via an opening in the rear rubber piece, said rear chamber having a constriction where an intermediate body provided with a longitudinal opening is fitted, said intermediate body being in contact with a piston also housed in a part of said constriction made in the tubular piece, an opening and closing mechanism associated to a float acting on a piston by means of a vertical element, it being provided for that the intermediate chamber be connected in a second direction to an inlet duct of a water network via a narrow opening made in the forward rubber piece; there being a larger duct concentric to said inlet duct for connecting the inlet duct with the tank via the outlet duct, the larger duct and the inlet duct being separated by means of an intermediate partition, the forward rubber piece being able to rest on a free edge of the intermediate partition, the forward rubber piece including a central ledge that extends outwards; the rear chamber being connected outside by means of a drainage; the faucet being characterised in that it includes:

a compensating spring (25) housed in a rear chamber (10) and which presses against a rear rubber piece (7), while an opposite end of the spring rests on an annular channel (36) of a tubular piece (5);

a non-return mechanism inserted in a diversion (48, 67) which connects with an outlet duct (3), and thereby reduces the development of hums and noises when water flows through the outlet duct (3);

at least two telescopic pipes (41,42), the larger of which (41) is connected to the outlet duct (3) to be adapted to the tank depth.

2. A faucet for filling tanks, according to claim 1, characterised in that the non-return mechanism comprises a small float (49) which blocks passage of the diversion where the float is installed when fluid flows through the outlet duct (3).

3. A faucet for filling tanks, according to claim 1, characterised in that the two telescopic pipes (41, 42) are associated at least via one friction rubber piece (43) which prevents vibrations and undesired noises.

4. A faucet for filling tanks, according to claim 1, characterised in that a free corner of a central ledge (46) of the forward rubber piece (6) has a rounded shape (47) for preventing noises and facilitating fluid flow.

5. A faucet for filling tanks, according to claim 1, characterised in that the linking means of the two elastic rubber pieces (6, 7) comprises an intermediate ring (8) arranged in correspondence with facing internal sides of the two rubber pieces (6, 7).

6. A faucet for filling tanks, according to claim 5, characterised in that the intermediate ring (8) has a structure formed by a narrow flat central body and two opposing conical shape bodies which fit into complementary channels in the two elastic rubber pieces (6, 7).

7. A faucet for filling tanks, according to claim 1, characterised in that the intermediate body (13) comprises:
a lower section (22) that includes a longitudinal opening (14), an underneath conical configuration facing the opening (11) in the rear rubber piece (7), said lower section (22) including a narrow extension (63) which projects upwards and faces the piston (16);
an upper tubular structure section (20) fitting inside the constriction (12) of the tubular piece (5).

8. A faucet for filling tanks, according to claim 7, characterised in that the tubular section (20) of the intermediate body (13) includes externally a plurality of longitudinal ribs (21) for centering and positioning the tubular piece (5).

9. A faucet for filling tanks, according to claim 7, characterised in that a lower part of the piston (16) is introduced inside the tubular section (20) of the intermediate body (13).

10. A faucet for filling tanks, according to claim 1, characterised in that the piston (16) includes an annular ledge (24) which is complemented with a step (23) in the constriction (12) of the tubular piece (5) so as to limit an outwards travel of said piston (16).

11. A faucet for filling tanks, according to claim 1, characterised in that the opening and closing mechanism associated with the float (19, 19') via a vertical element (18), comprises a lever (17) which links with two lateral stubs (28) integral with the tubular piece (5), one end of the lever (17) including a short transverse shaft (29) that fits into a recess (30) belonging to a tilting piece (31) which, by means of a second shaft (32) articulates with a slot (33) of the tubular piece (5); said tilting piece (31) articulating into a central recess (34) of the piston (16) via a short central shaft (35).

12. A faucet for filling tanks, according to claim 1, characterised in that the float (19) includes in an upper base a rail (50) which gives rise to a small tank suitable to be filled with a fluid selected from water and other fluids.

13. A faucet for filling tanks, according to claim 1, characterised in that the float is closed underneath by means of a cover (51, 51').

14. A faucet for filling tanks, according to claims 1 and 13, characterised in that the float (19), includes a plurality of small holes (52, 53) for allowing entrance of water and exit of air.

15. A faucet for filling tanks, according to claim 1, characterised in that the free edge of the intermediate partition (44) separating the concentric inlet duct (2) and larger duct (40) has an essentially curved-convex shape (45).

16. A faucet for filling tanks, according to claim 1, characterised in that the free edge of the intermediate partition (44) is made in a lower plane beneath a plane where the forward elastic rubber piece (6) rests.

17. A faucet for filling tanks, according to claim 1, characterised in that the drainage that links the rear chamber (10) with the outside is made in a union thread (26) between the casing (1) and a tightening piece (4) which joins the tubular piece (5) to the casing (1); said tubular piece (5) also having a plurality of radial holes (27) which connect the rear chamber (10) with the union thread (26) joining the casing (1) to the tightening piece (4).

18. A faucet for filling tanks, according to claim 17, characterised in that the drainage comprises at least one smooth recess made in the union thread (26) joining the casing (1) to the tightening piece (4).

19. A faucet for filling tanks, according to claim 1, characterised in that the larger duct (40) arranged concentrically with the inlet duct (2) has a narrow tubular drainage extension (55).

20. A faucet for filling tanks, according to claim 1, characterised in that an annular channel (56) is made on an outer face of the forward rubber piece.

21. A faucet for filling tanks, according to claim 7, characterised in that the upper section (20) of the intermediate body (13) includes a plurality of radial fins (59) whose upper ends end in small internal flanges (60) which are complemented with a slight annular step (61) of the piston (16).

22. A faucet for filling tanks, according to claim 1, characterised in that the piston (16) includes a longitudinal rib (57) which fits with play into a complementary channel (58) made in the tubular piece (5) so as to prevent the piston (16) from rotating and to provide a better axial guidance for the piston.

23. A faucet for filling tanks, according to claim 1, characterised in that the piston (16) comprises a plurality of radial recesses (62) for allowing fluid to flow.

24. A faucet for filling tanks, according to claim 13, characterised in that the cover (51') of the float (19) comprises at least one air cavity (54) so as to provide an additional thrust for the float (19) when it is floating.

25. A faucet for filling tanks, according to claim 1, characterised in that the float (19, 19') is provided with an internal recess (65) for coupling a threaded vertical shaft (18) which links the opening and closing mechanism with the float (19, 19').

26. A faucet for filling tanks, according to claim 1, characterised in that the float (19, 19') includes an exterior mechanism (64, 64') for coupling a vertical threaded shaft (18) which links the opening and closing mechanism with the float (19, 19').

27. A faucet for filling tanks, according to claim 26, characterised in that the exterior mechanism (64') comprises a tilting piece (71) articulated to the float in a perpendicular direction to the vertical shaft (18) which is associated with said tilting piece (71).

28. A faucet for filling tanks, according to claim 27, characterised in that the tilting piece (71) comprises a tubular structure with two facing stubs (72) which are articulated in complementary holes (73) located in parallel arms (74) integral to the float.

29. A faucet for filling tanks, according to claim 28, characterised in that the tubular structure tilting piece (71) is provided with an internal thread (75) where a thread of the vertical shaft (18) couples.

30. A faucet for filling tanks, according to claim 26, characterised in that the exterior mechanism (64) comprises a tubular throat for coupling to the threaded vertical shaft (18).

31. A faucet for filling tanks, according to claim 25, characterised in that the float (19') is provided with an arm (76) for connection to the threaded vertical shaft (18), said arm starting from a sliding area of the float (19') and extending up to the opposite end of the float.

32. A faucet for filling tanks, according to claim 31, characterised in that the arm (76) of the float (19') comprises at a connection end with the vertical shaft (18) an exterior mechanism (64').

33. A faucet for filling tanks, according to claim 31, characterised in that the arm (76) of the float (19') comprises at the connection end with the vertical shaft (18) an exterior throat corresponding to the exterior mechanism (64).

34. A faucet for filling tanks, according to claim 30, characterised in that the arm (76) has two areas for connecting to the vertical shaft (18), a external area (64, 64') and an interior throat (65).

* * * * *